(12) United States Patent
Hasenberg et al.

(10) Patent No.: US 11,168,157 B2
(45) Date of Patent: Nov. 9, 2021

(54) MELT FLOW INDEX RESPONSE IN POLYETHYLENE REACTORS

(71) Applicant: Chevron Phillips Chemical Company LP, The Woodlands, TX (US)

(72) Inventors: Daniel M. Hasenberg, Kingwood, TX (US); Jeffrey S. Lowell, Huffman, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 299 days.

(21) Appl. No.: 16/209,122

(22) Filed: Dec. 4, 2018

(65) Prior Publication Data
US 2020/0172640 A1  Jun. 4, 2020

(51) Int. Cl.
*C08F 10/02* (2006.01)
*C08F 2/44* (2006.01)
*C08F 210/16* (2006.01)

(52) U.S. Cl.
CPC .................. *C08F 10/02* (2013.01)

(58) Field of Classification Search
USPC ..................................... 526/59, 74
See application file for complete search history.

(56) References Cited

U.S. PATENT DOCUMENTS

| | | |
|---|---|---|
| 3,256,263 A | 6/1966 | Wisseroth et al. |
| 3,919,185 A | 11/1975 | Takebe et al. |
| 4,182,810 A | 1/1980 | Wilcox |
| 4,379,758 A | 4/1983 | Wagner et al. |
| 4,383,095 A | 5/1983 | Goeke et al. |
| 4,532,311 A | 7/1985 | Fulks et al. |
| 4,703,094 A | 10/1987 | Raufast |
| 4,876,320 A | 10/1989 | Fulks et al. |
| 5,026,795 A | 6/1991 | Hogan |
| 5,055,535 A | 10/1991 | Spitz et al. |
| 5,453,471 A | 9/1995 | Bernier et al. |
| 6,413,477 B1 | 7/2002 | Govoni et al. |
| 6,689,845 B1 | 2/2004 | Govoni et al. |
| 7,470,757 B2 | 12/2008 | Miserque et al. |
| 8,809,472 B2 | 8/2014 | Benham et al. |
| 2009/0143546 A1 | 6/2009 | Fouarge et al. |
| 2010/0292418 A1 | 11/2010 | Jorgensen et al. |

OTHER PUBLICATIONS

Partial International Search Report issued in corresponding application No. PCT/US2019/061907 dated Feb. 21, 2020, 2 pgs.

*Primary Examiner* — Fred M Teskin
(74) *Attorney, Agent, or Firm* — Eversheds Sutherland (US) LLP

(57) ABSTRACT

This disclosure provides for polymerization processes of polyolefins wherein the melt index can be regulated. For example, there is provided a process for producing a polyethylene, the process comprising: (1) in a polymerization reactor, contacting (a) a polymerization catalyst, (b) ethylene, (c) an optional α-olefin comonomer, and (d) (x+y) ppm by weight of an antistatic agent on an ethylene basis; and (2) applying reaction conditions to the reaction mixture suitable to produce the polyethylene having a desired set of characteristics, such as desired target melt index. The disclosed polymerization processes allow for production of polyolefins having higher melt indices, and in the alternative to produce polyolefins having a desired target melt index at lower polymerization temperatures.

20 Claims, No Drawings

MELT FLOW INDEX RESPONSE IN POLYETHYLENE REACTORS

CROSS REFERENCE TO RELATED APPLICATIONS

None.

TECHNICAL FIELD OF THE DISCLOSURE

This disclosure relates to high-density polyethylene and processes for adjusting the melt flow index of high-density polyethylene.

BACKGROUND

High-density polyethylene (HDPE) is a commercially important thermoplastic polymer produced by polymerization of ethylene. The HDPE polymer is useful across a wide range of applications, particularly when its properties are tailored for a specific utility. One important property to be able to control and adjust is molecular weight. In many olefin polymerization processes, for example Ziegler-catalyzed processes, adjusting the hydrogen concentration provides control of the polymer molecular weight.

However, in other polymerization systems such as chrome-catalyzed HDPE processes, adjusting the hydrogen concentration is not particularly effective at providing the same level of control. In these chrome-catalyzed HDPE polymerization processes, the control of the molecular weight as determined by the molecular flow index is typically limited to adjusting the polymerization temperature, with the melt flow index generally increasing with increasing temperature. However, there are upper limits to the melt flow index ranges that can be achieved by increasing the reaction temperature.

As a result, there remains a need for new processes that might provide molecular weight and melt flow index adjustments at lower polymerization temperatures. There is also a need for methods to adjust and control melt flow index that is applicable across a wider range of polymerization catalysts and systems. For example, new catalyzed HDPE processes that produce polymers with higher melt flow indices at a given polymerization temperature would be useful.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In one aspect, this disclosure provides processes for polymerizing at least one olefin monomer comprising ethylene to form a polyethylene such as a high-density polyethylene (HDPE), in which its molecular weight as reflected in its melt index can be adjusted by tailoring the concentration or amount of an antistatic component that is used in the polymerization process. Therefore, it has been unexpectedly discovered that increasing the concentration of an antistatic agent over an amount that provides a known melt index under specific polymerization conditions can increase the melt index of the resulting polyethylene under those same polymerization conditions. In a further aspect, it has been discovered that increasing the concentration of an antistatic agent over an amount that provides a known melt index under specific polymerization conditions can result in production of a polyethylene having the same melt index when the polymerization is carried out at lower temperature but otherwise identical polymerization conditions.

These various aspects of polymerization processes are disclosed in detail herein. For example, this disclosure demonstrates how to produce a HDPE having higher than expected melt flow indices as compared to a reference or comparative HDPE produced under substantially similar polymerization conditions. In another example, this disclosure demonstrates how to produce a HDPE having similar melt flow indices as compared to a reference or comparative HDPE, in which the HDPE is produced at lower polymerization temperatures but otherwise under substantially similar polymerization conditions as the reference or comparative HDPE. In an aspect and in a further example, this disclosure demonstrates how to produce HDPE having higher melt flow indices than conventionally attainable by merely increasing polymerization temperature in the HDPE process. According to a further aspect, the HDPE processes described herein can be used in reactors such as gas phase reactors, fluidized bed reactors, loop reactors, stirred tank reactors, loop-slurry reactors, slurry reactors, and the like.

In the course of producing HDPE, it was discovered that melt flow index could be adjusted by adjusting the amount or concentration of antistatic agents used during the polymerization process while maintaining the remaining polymerization conditions to identical or substantially similar conditions or ranges, for example, about ±5% of other parameters used in producing the comparative HDPE. According to an aspect, for example, there is provided a process for polymerizing an olefin, the process comprising:

in a polymerization reactor, contacting (a) a polymerization catalyst, (b) ethylene, (c) an optional α-olefin comonomer, and (d) (x+y) ppm by weight of an antistatic agent on an ethylene basis under selected polymerization conditions to produce a polyethylene having a target density ($d_t$), and a target melt index $MI^t$(g/10 min);

wherein x and y are greater than 0, and x is calculated according to the formula:

$$MI^t = MI^c + ax;$$

wherein $MI^c$ is a melt index (g/10 min) of a comparative polyethylene produced in the presence of y ppm antistatic agent under comparative polymerization conditions that are otherwise identical to the selected polymerization conditions, and wherein the coefficient a is according to the target melt index ($MI^t$).

That is, the adjustments of the concentration of an antistatic agent on an ethylene basis under selected polymerization conditions used to calculate the (x+y) ppm by weight of an antistatic agent are selected according to the particular target molecular weight, as explained herein.

Also in the course of producing HDPE, it was discovered that the increased melt flow index attained by increasing the amount of antistatic agents used during the polymerization process further allowed ethylene to be polymerized at lower polymerization temperatures to maintain constant melt flow indices, as compared with a comparative or reference HDPE. Therefore, in an aspect this disclosure provides a process for maintaining the melt index of a polyethylene while lowering the polymerization temperature in a gas-phase reaction, the process comprising:

in a gas-phase polymerization reactor, contacting (a) a chromium polymerization catalyst, (b) ethylene, (c) an optional α-olefin comonomer, and (d) (x+y) ppm of an antistatic agent under selected polymerization conditions comprising a target temperature $T^t$ to produce a polyethylene having a target density ($d_T$), and a target melt index $MI^t$ (g/10 min);

wherein x and y are greater than 0, and the target temperature $T^t$ is calculated according to the formula;

$$T^t(° F.)=T^c(° F.)-a(° F.)x;$$

wherein $T^c$ is a comparative temperature at which the polyethylene having the melt index MI is produced in the presence of y ppm antistatic agent under comparative polymerization conditions that are otherwise identical to the selected polymerization conditions, and wherein the coefficient a is selected according to the target melt index ($MI^t$).

These and other aspects of the processes are described more fully in the Detailed Description and claims provided herein.

DETAILED DESCRIPTION OF THE DISCLOSURE

General Description

This disclosure provides generally for catalytic processes for polymerizing ethylene to form a high-density polyethylene (HDPE) with higher melt indices than what was previously attainable under specified conditions, and also provides catalytic processes to produce a polyethylene with a target melt index at lower polymerization temperatures. It has been discovered that using antistatic agents, allows HDPE to be produced using substantially lower temperatures and milder conditions than the standard conditions used to form HDPE.

This discovery allows for the production of HDPE with higher melt indices carried out in low pressure reactors such as slurry reactors, loop-slurry reactors, gas phase reactors, and the like. The subject polymerization processes include the addition of an antistatic agent to the polymerization mixture.

A wide range of antistatic agents can be used according to the present disclosure. For example, a suitable antistatic agent can comprise, consist essentially of, consist of, or be selected from an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane, an aryl sulfonic acid, a $C_8$-$C_{18}$ alkyl-substituted aryl sulfonic acid, salts thereof, and/or combinations thereof. Specific examples of antistatic agents and combinations thereof that can be used in accordance with this disclosure are described herein.

Definitions of terms that are used in this disclosure are set out below.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "an antistatic agent," "an α-olefin comonomer," "a polymerization catalyst," and the like, is meant to encompass one, or mixtures or combinations of more than one antistatic agent, α-olefin comonomer, catalyst, and the like, unless otherwise specified.

The terms "including," "with," and "having" as used herein, are defined as comprising (i.e., open language), unless specified otherwise.

The terms "optional" or "optionally" means that the subsequently described event or circumstance can or cannot occur, and that the description includes instances where the event or circumstance occurs and instances where it does not.

The terms "configured for use" or "adapted for use" and similar language is used herein to reflect that the particular recited structure or procedure is used in an olefin polymerization system or process. For example, unless otherwise specified, a particular structure "configured for use" means it is "configured for use in an olefin polymerization reactor system" and therefore is designed, shaped, arranged, constructed, and/or tailored to effect an olefin polymerization, as would have been understood by the skilled person.

The terms "similar," "identical," or "comparable" when used to modify polymerization conditions means substantially identical in all substantive, functional, and practical aspects, including reactor type, reactor size, mass flow rate, antistatic agent, α-olefin comonomer, temperature, pressure, and other operating parameters to a set of reference polymerization conditions.

The term "hydrocarbon" refers to a compound containing only carbon and hydrogen. Other identifiers can be utilized to indicate the presence of particular groups in the hydrocarbon, for instance, a halogenated hydrocarbon indicates the presence of one or more halogen atoms replacing an equivalent number of hydrogen atoms in the hydrocarbon.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene, and the like are non-limiting examples of olefins. The term "alpha olefin" or "α-olefin" as used in this specification and claims refers to an olefin that has a double bond between the first and second carbon atom of the longest contiguous chain of carbon atoms. The term "alpha olefin" includes linear and branched alpha olefins unless expressly stated otherwise.

The term "antistatic agent" is used to describe static dissipator additives used to prevent static charge build up in polymers and in reactor systems. Antistatic agents can include, but are not limited to, one or more of the following chemical compound types or chemical moieties: an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a di-t-butylphenol, an aluminum stearate, a sorbitan monooleate, a glycerol monostearate, a methyl toluate, a dimethyl maleate, a triethylamine, a 3,3-diphenyl-3-(imidazol-1-yl)-propane, a quaternary ammonium compound, metal oxides, metal salts thereof, or combinations thereof. Substituted analogs and salt form of these chemical moieties are encompassed in this group. For example, these terms describe a $C_8$-$C_{18}$ alkyl-substituted aryl sulfonic acid and a dimethyl fumarate. The skilled person will understand that these compounds can prevent static build up in polymers and can be functionalized as described.

For any particular compound or group disclosed herein, any name or structure presented is intended to encompass all conformational isomers, regioisomers, stereoisomers, and mixtures thereof that can arise from a particular set of substituents, unless otherwise specified. The name or structure also encompasses all enantiomers, diastereomers, and other optical isomers (if there are any) whether in enantiomeric or racemic forms, as well as mixtures of stereoisomers, as would be recognized by a skilled person, unless otherwise specified. For example, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Various numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. For example, by disclosing a density from 0.950 g/cm$^2$ to 0.960 g/cm$^2$, Applicants' intent is to recite individually 0.950 g/cm$^2$, 0.951 g/cm$^2$, 0.952 g/cm$^2$, 0.953 g/cm$^2$, 0.954 g/cm$^2$, 0.955 g/cm$^2$, 0.956 g/cm$^2$, 0.957 g/cm$^2$, 0.958 g/cm$^2$, 0.959 g/cm$^2$, and 0.960 g/cm$^2$, including any sub-ranges and combinations of sub-ranges encompassed therein, and these methods of describing such ranges are interchangeable. Moreover, all numerical end points of ranges disclosed herein are approximate, unless excluded by proviso. As a representative example, if Applicants disclose in an aspect of the disclosure that one or more steps in the processes disclosed herein can be conducted to produce a polyethylene having a density in a range from 0.956 g/cm$^2$ to 0.960 g/cm$^2$, this range should be interpreted as encompassing densities in a range from "about" 0.956 g/cm$^2$ to "about" 0.960 g/cm$^2$.

Values or ranges may be expressed herein as "about", from "about" one particular value, and/or to "about" another particular value. When such values or ranges are expressed, other aspects disclosed include the specific value recited, from the one particular value, and/or to the other particular value. Similarly, when values are expressed as approximations, by use of the antecedent "about," it will be understood that the particular value forms another aspect. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, or ±3% of the stated value.

Applicants reserve the right to proviso out or exclude any individual members of any such group of values or ranges, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants can be unaware of at the time of the filing of the application.

The term "substituted" when used to describe a group, for example, when referring to a substituted analog of a particular group, is intended to describe the compound or group wherein any non-hydrogen moiety formally replaces hydrogen in that group or compound, and is intended to be non-limiting. A compound or group can also be referred to herein as "unsubstituted" or by equivalent terms such as "non-substituted," which refers to the original group or compound. "Substituted" is intended to be non-limiting and include inorganic substituents or organic substituents as specified and as understood by one of ordinary skill in the art.

The term "melt index" or MI is used synonymously with "melt flow index" (MFI) or "melt flow rate" (MFR), and is determined in accordance with the standards set forth in ASTM D1238. Briefly, the test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel.

Although any methods and materials similar or equivalent to those described herein can be used in the practice or testing of the present disclosure, the typical methods and materials are herein described.

The Abstract of this application is not intended to be used to construe the scope of the claims or to limit the scope of the subject matter that is disclosed herein, but rather to satisfy the requirements of 37 C.F.R. § 1.72(b), to enable the United States Patent and Trademark Office and the public generally to determine quickly from a cursory inspection the nature and gist of the technical disclosure. Moreover, any headings that are employed herein are also not intended to be used to construe the scope of the claims or to limit the scope of the subject matter that is disclosed herein. Any use of the past tense to describe any example otherwise indicated as constructive or prophetic is not intended to reflect that the constructive or prophetic example has actually been carried out.

All publications and patents mentioned herein are incorporated herein by reference for the purpose of describing and disclosing, for example, the constructs and methodologies that are described in the publications, which might be used in connection with the present disclosure. The publications discussed throughout the text are provided solely for their disclosure prior to the filing date of the present application. Nothing herein is to be construed as an admission that the inventors are not entitled to antedate such disclosure by virtue of prior invention.

Polymerization Process

The present disclosure is directed generally to various aspects of tailoring or modifying the melt index of a polymer in the olefin polymerization process. Illustrative aspects of the subject matter claimed are disclosed. Although one or more of these aspects may be preferred, the aspects disclosed should not be interpreted, or otherwise used, as limiting the scope of the disclosure, including the claims. In the interest of clarity, not all features of an actual aspect need to be described in this specification, because one skilled in the art will understand the scope of the disclosure. It is to be fully recognized that the different teachings of the aspects discussed below may be employed separately or in any suitable combination to produce desired results. In addition, one skilled in the art will understand that the following description has broad application, and the discussion of any aspect is meant only to be exemplary of that aspect, and not intended to intimate that the scope of the disclosure, including the claims, is limited to that aspect.

Generally, this disclosure provides for an improved MI response in chromium catalyzed polyethylene synthesis reactors by tailoring the concentration of an antistatic agent. For example, this disclosure describes methods to increase the melt index potential using increased amounts or concentration of an anti-fouling agent. In an aspect, this disclosure demonstrates how the ethylene partial pressure can remain high in the polymerization system, while the reactor is operated at lower temperatures, which allows for production of higher melt index resins using, for example, chrome catalysts.

Control of molecular weight as measured by melt index in chromium catalyzed polyethylene reactors has typically been limited to the use of temperature as a control method. That is, increasing the polymerization temperature is observed to increase the melt index of the resulting resin. One limitation in this method is that polymerization processes have practical upper limits to their operating temperatures and as a result, there are corresponding upper limits to the melt indices that can be achieved in chrome catalyzed polyethylene reactors. While the presence of hydrogen is used to increase the melt index in Ziegler catalyzed reactors, there is generally no corresponding option for in chrome catalyzed olefin polymerization processes.

In an aspect, it has been discovered that a step change increase in the melt index can be achieved in a gas phase HDPE reactor upon using higher concentrations of an antistatic agent, for example, STADIS® 450, or similar antistatic agents. In another aspect, the increase in the observed melt index response has allowed the use of lower polymerization reactor temperatures in order to maintain a constant melt index as compared to a comparative HDPE prepared using the conventional lower concentrations of antistatic agent but otherwise prepared under identical conditions. Moreover, it is observed that this decrease in temperatures occurs even when using higher ethylene partial pressures as compared to the ethylene partial pressures in the comparative processes. While not intending to be bound by theory, higher ethylene pressures were previously observed as tending to lower melt index in the gas phase HDPE reactor. It has now been discovered that lower temperatures can still be used with higher antistatic agent concentrations, even with higher ethylene partial pressures.

In a further aspect, the processes of this disclosure can be carried out in a polymerization reactor that comprises or is selected from a gas phase reactor, a fluidized bed reactor, a loop reactor, a stirred tank reactor, a loop-slurry reactor, or a slurry reactor. Moreover, suitable polymerization catalysts can comprise or can be selected from a chromium catalyst, a metallocene catalyst, a post-metallocene catalyst, or a Ziegler-Natta catalyst.

The olefin monomers utilized in the polymerization processes described herein may be selected from but are not limited to $C_2$ to $C_{30}$ olefin monomers and comonomers generally, including ethylene alone or in combination with any of $C_3$-$C_{30}$ comonomers. In another aspect, any $C_2$ to $C_{20}$, $C_2$ to $C_{12}$, or $C_2$ to $C_8$ olefin monomers and comonomers can be used. Examples include but are not limited to ethylene, propylene, butene, pentene, 4-methyl-1-pentene, hexene, octane, and decene. The monomers may include olefinic unsaturated monomers, $C_4$ to $C_{18}$ diolefins, conjugated or nonconjugated dienes, polyenes, vinyl monomers and cyclic olefins. Additional non-limiting examples of monomers may include norbornene, norbornadiene, isobutylene, isoprene, vinylbenzycyclobutane, styrene, alkyl substituted styrene, ethylidene norbornene, dicyclopentadiene, and cyclopentene. The formed polyolefin may include homopolymers, copolymers or terpolymers. In one or more aspects, the olefin monomers are selected from $C_2$-$C_6$ olefin monomers.

In one or more aspects, the processes described herein include the homopolymerization of ethylene. In alternative aspects, the processes described herein include the copolymerization of ethylene and a higher olefin comonomer, such as but not limited to propene, butene, 1-pentene, 1-hexene, 1-octene, or 1-decene. For example, the process may include the copolymerization of ethylene and a starting amount of comonomer ranging from 0.01 wt. % to 10 wt. %, or from 0.01 wt. % to 5 wt. %, or from 0.1 wt. % to 4 wt. %.

Examples of polymerization processes carried out in the presence of antistatic agents are disclosed in, for example, U.S. Pat. Nos. 3,919,185, 4,182,810, 4,532,311, and 5,026,795.

Melt Index Response

Previously, the upper limit melt index of an HDPE resin generally achievable in the gas phase chrome catalyzed reactor has been about 0.40. Using the methods of this disclosure, melt indices of greater 0.40 are readily achievable. For example, in one aspect, the upper limit of HDPE melt indices that can be produced can be about 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, or about 0.65. It is also possible to achieve melt indices greater than about 0.65. Generally, the lower limit of melt indices that are produced in the discloses processes are about the same as previously attained, for example, from about 0.18 to about 0.22. Thus, HDPE resins having such high melt indices achieved by the disclosed methods using chrome catalyst provide for numerous applications and uses of such resins.

In an aspect, there is provided in the present disclosure a process for polymerizing olefins, the process comprising:

in a polymerization reactor, contacting (a) a polymerization catalyst, (b) ethylene, (c) an optional α-olefin comonomer, and (d) (x+y) ppm by weight of an antistatic agent on an ethylene basis under selected polymerization conditions to produce a polyethylene having a target melt index $MI^r$ (g/10 min);

wherein x and y are greater than 0, and x is calculated according to the formula $MI^t=MI^c+(0.006)x$, wherein $MI^c$ is a melt index (g/10 min) of a comparative polyethylene produced in the presence of y ppm antistatic agent under comparative polymerization conditions that are otherwise identical to the selected polymerization conditions.

That is, the overall melt index response is that a 1 ppm increase in concentration of antistatic agent generally results in a 0.006 increase in melt index. This aspect of the present disclosure does not take into account a target polyethylene density, but rather is based on a range of polyethylene densities.

In another aspect, the present disclosure provides a process for increasing the melt index of a polyethylene, the process comprising:

i) in a polymerization reactor, contacting (a) a polymerization catalyst, (b) ethylene, (c) an optional α-olefin comonomer, and (d) y ppm by weight of an antistatic agent on an ethylene basis, under comparative polymerization conditions to produce a comparative polyethylene having a melt index $MI^c$ (g/10 min);

ii) selecting a concentration (x+y) ppm by weight of the antistatic agent on an ethylene basis that will produce a target polyethylene having a melt index $MI^t$(g/10 min) calculated according to the formula $MI^t=MI^c+(0.006)x$; and iii) contacting (a) the c polymerization catalyst, (b) ethylene, (c) the optional α-olefin comonomer, and (d) (x+y) ppm by weight of the antistatic agent on an ethylene basis under selected polymerization conditions that are otherwise identical to the comparative polymerization conditions to produce a target polyethylene having a melt index $MI^t$(g/10 min);

wherein x and y are greater than 0.

Further to these aspects in which the target melt index being determined according to $MI^t=MI^c+(0.006)x$, when $MI^t$ is from about 0.30 to about 0.65 g/10 min, x generally can be a number from about 0.5 to about 50. When $MI^t$ is from about 0.35 to about 0.55 g/10 min, x generally can be a number from about 2 to about 25. Further, when $MI^t$ is from about 0.37 to about 0.50 g/10 min, x generally can be a number from about 3 to about 15.

Also further to these aspects in which the target melt index being determined according to $MI^t=MI^c+(0.006)x$, the target melt index $MI^t$ can be at least 20% greater than the melt index $MI^c$ of the comparative polyethylene. In another aspect, the target melt index $MI^t$ can be at least 50% greater than the melt index $MI^c$ of the comparative polyethylene.

Also in regard to these aspects in which the target melt index being determined according to $MI^t=MI^c+(0.006)x$, the density of the polyethylene produced in the process can differ by about ±0.01 g/mL from the density of the comparative polyethylene. In another aspect, the density of the polyethylene produced in the process can differ by about ±0.05 g/mL from the density of the comparative polyethylene. Further, the normalized catalyst activity in the production of the polyethylene using the increased concentration of antistatic agent can generally decrease by less than about 10% from the normalized catalyst activity in the production of the comparative polyethylene.

In a further aspect, this disclosure provides a process for maintaining the melt index of a polyethylene while lowering the polymerization temperature in a gas-phase reaction, the process comprising:

in a gas-phase polymerization reactor, contacting (a) a chromium polymerization catalyst, (b) ethylene, (c) an optional α-olefin comonomer, and (d) (x+y) ppm of an antistatic agent under selected polymerization conditions comprising a target temperature $T^t$ to produce a polyethylene having a melt index MI (g/10 min);

wherein x and y are greater than 0, and the target temperature $T^t$ is calculated according to the formula $T^t$ (° F.)=$T^c$(° F.)–(1° F.)x, wherein $T^c$ is a comparative temperature at which the polyethylene having the melt index MI is produced in the presence of y ppm antistatic agent under comparative polymerization conditions that are otherwise identical to the selected polymerization conditions.

In accordance with this process, generally, $T^t$ can be from about 0.5° F. to about 15° F. lower than $T^c$, or $T^t$ can be from about 1.0° F. to about 10° F. lower than $T^c$. In another aspect, MI can be from about 0.30 g/10 min to about 0.65 g/10 min, or MI can be from about 0.35 g/10 min to about 0.55 g/10 min.

According to a further aspect, there is provides a process for increasing the melt index of a polymer, the process comprising:

in a polymerization reactor, contacting (a) a polymerization catalyst, (b) ethylene ($C_2$), (c) 1-hexene ($C_6$), and (d) an antistatic agent under polymerization conditions of temperature (° F.), $C_2$ pressure (psi), antistatic agent concentration (ppm on $C_2$ basis), and $C_6$ concentration (weight ratio to $C_2$) to produce a polyethylene having a melt index (MI, g/10 min) greater than 0.3;

wherein the antistatic agent is present at a concentration of greater than 10 ppm by weight on an ethylene basis, which is selected based on a polyethylene target melt index ($MI^t$, g/10 min) according to the formula:

$MI^t$(target melt index)=(0.0017)(° F.)+(–0.009)($C_2$ pressure, psi)+(0.0066)(ppm antistatic agent on $C_2$ basis)+(–0.8)($C_6$ weight ratio to $C_2$).

Antistatic Agents

In accordance with this disclosure, a wide range of antistatic agents can be used in the polymerization processes described herein. In one aspect, the antistatic agent can comprise or can be selected from an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

According to another aspect, the antistatic agent can comprise or can be selected from di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

In another aspect, the antistatic agent comprises an aryl sulfonic acid, a $C_8$-$C_{18}$ alkyl-substituted aryl sulfonic acid, salts thereof, or any combination thereof. The antistatic agent can also comprise or can be selected from a $C_{10}$-$C_{16}$ alkyl-substituted benzenesulfonic acid, a $C_{10}$-$C_{16}$ alkyl-substituted naphthalenesulfonic acid, salts thereof, or any combination thereof.

Examples of suitable antistatic agents that can be used according to this disclosure include, but are not limited to, STADIS® 425 antistatic agent, STADIS® 450 antistatic agent, Dorf Ketal SR 1795® antistatic agent, TOLAD® 3512 antistatic agent, ARMOSTAT® 310 antistatic agent, ATMER® 163 antistatic agent, ATMER® AS-990 antistatic agent, KEROSTAT CE® 4009 antistatic agent, KEROSTAT CE® 5009 antistatic agent, POLYFLO® 130 antistatic agent, TOLAD® 511 antistatic agent, STATSAFE® 3000 antistatic agent, STATSAFE® 6000 antistatic agent, or EDENOL® D32 antistatic agent. Suitable combinations of antistatic agents can be used as understood by the person of ordinary skill.

Polymerization Systems

The processes of the present disclosure are applicable to a variety of polymerization systems and specific polymerization processes and are applicable across a wide range of other target polymer properties. Desired polymer properties can include, for example, certain melt, physical, rheological, and/or mechanical properties for specific commercial end uses. Properties that may be adjusted in the polymerization process can include, for example, density, melt index (MI), comonomer content, molecular weight, branching, crystallinity, and the like. Among other things, selection and control of the reaction conditions within the reactor, such as temperature, pressure, chemical concentrations, polymer production rate, catalyst type, and so forth, can be used to adjust the polymer properties. In addition, monomer, co-monomer, catalyst, initiators, additives, and the like can also influence the polymer properties.

The polymerization conditions (e.g., equipment, process conditions, reactants, additives, and other materials used in polymerization processes) also will vary in a given process, depending on the desired composition and properties of the polymer being formed. Such processes may include solution phase, gas phase, slurry phase, bulk phase, high pressure processes or combinations thereof.

In a conventional gas phase polymerization process a gaseous stream containing one or more monomers is passed into a fluidized bed reactor containing a bed of growing polymer particles in a polymerization zone, while continuously or intermittently introducing a polymerization catalyst and additives, such as an antistatic agent, into the polymerization zone. The production of polymer in a stirred bed reactor is similar, differing primarily in the use of mechanical stirring means to assist in maintaining the polymer bed in a fluidized condition. Conventional gas phase fluidized bed resin production is very well known in the art as shown, for example, by the disclosure appearing in U.S. Pat. Nos. 4,379,758, 4,383,095, and 4,876,320, which are incorporated herein by reference. The production of polymeric substances in gas phase stirred reactors is also well known in the art as exemplified by the process and equipment descriptions appearing in for example, U.S. Pat. No. 3,256,263. Again, the processes of the present disclosure are applicable each of these polymerization systems and methods.

In a further aspect, a gas phase polymerization process may be carried out continuously in one or more loop reactors. In continuous loop reactors, feed materials, such as monomer, catalyst, and additives, such as antistatic agents, are introduced to the reactor and product polyolefin particles are taken off in continuous loop reactors, the various feed materials may be introduced to the loop reaction zone in various ways. For example, the monomer, catalyst, and antistatic agent may be introduced separately or together and the monomer, catalyst, and antistatic agent may be mixed with varying amounts of diluent prior to introduction to the reaction zone. As they circulate through the loop reaction zone, the monomer reacts at the catalyst site in a polymerization reaction and the polymerization reaction yields polyolefin particles. The loop reactor may be maintained at a partial pressure of monomer from about 89 psi to about 168 psi and a temperature of from about 180° F. to about 220° F. Reaction heat may be removed through the loop wall via any suitable method, such as via a double-jacketed pipe or heat exchanger. Additional details regarding gas phase polymerization processes may be found, for example, in U.S. Pat. Nos. 4,703,094, 5,055,535, 5,453,471, 6,413,477, and 6,689,845, which are incorporated herein by reference in their entireties.

Alternatively, other types of polymerization processes may be used, such as stirred reactors in series, parallel, or combinations thereof.

EXAMPLES

Aspects described herein are uniquely capable of forming and maintaining the production of polyolefins having a desired set of characteristics. The desired set of characteristics can include any of a variety of properties, including but not limited to, density and melt index.

The properties of polyolefins produced by a polymerization process are a function of reaction zone conditions and the ratio of comonomer to olefin monomer. The Examples and the data tables below illustrate exemplary results of polymerization processes of olefins wherein various process conditions change and their effect on the melt index. In these examples, regression of polymerization provided the correlation between melt index and amount of antistatic agent for the various target densities.

Generally the polymerization processes for polymerizing olefins of the present disclosure comprise contacting (a) a polymerization catalyst, (b) a monomer, such as ethylene, (c) an α-olefin comonomer, and (d) an antistatic agent in a polymerization reactor to produce a polyolefin having a target density ($d_T$) and a target melt index $MI^t$ (g/10 min).

The data in the following examples was obtained under commercial polymerization operating conditions in a well-mixed, fluidized bed gas phase reactor operating in condensation mode utilizing a chrome catalysis, for the copolymerization of ethylene and 1-hexene.

Example 1

The table below sets out samples of polymerization data in the following table obtained under various conditions from the copolymerization of ethylene and 1-hexene to produce a polyethylene having a target density ($d_T$) in the range from 0.940 to 0.946.

TABLE 1

Copolymerization of ethylene and 1-hexene to produce a polyethylene having a target density ($d_T$) in the range from 0.940 to 0.946.

| Example | Polymerization temperature (° F.) | Ethylene partial pressure (psi) | Antistatic agent (ppm) | Ethylene Feed rate (lb/hr) | 1-Hexene Feed rate (lb/hr) | Melt index (g/10 min) |
|---|---|---|---|---|---|---|
| 1A | 203.9 | 103.8 | 14.500 | 66000 | 1307.7 | 0.220 |
| 1B | 197.1 | 159.2 | 10.000 | 59000 | 1255.3 | 0.250 |
| 1C | 204.0 | 111.9 | 9.987 | 68000 | 1297.3 | 0.300 |
| 1D | 207.1 | 108.2 | 13.998 | 70000 | 1921.1 | 0.350 |

TABLE 1-continued

Copolymerization of ethylene and 1-hexene to produce a polyethylene having a target density ($d_T$) in the range from 0.940 to 0.946.

| Example | Polymerization temperature (° F.) | Ethylene partial pressure (psi) | Antistatic agent (ppm) | Ethylene Feed rate (lb/hr) | 1-Hexene Feed rate (lb/hr) | Melt index (g/10 min) |
|---|---|---|---|---|---|---|
| 1E | 202.8 | 146.6 | 13.998 | 77500 | 1497.7 | 0.400 |
| 1D | 203.3 | 142.0 | 13.998 | 78500 | 1497.3 | 0.420 |

Example 2

The table below sets out samples of polymerization data in the following table obtained under various conditions from the copolymerization of ethylene and 1-hexene to produce a polyethylene having a target density ($d_T$) in the range from 0.947 to 0.951.

TABLE 2

Copolymerization of ethylene and 1-hexene to produce a polyethylene having a target density ($d_T$) in the range from 0.947 to 0.951.

| Example | Polymerization temperature (° F.) | Ethylene partial pressure (psi) | Antistatic agent (ppm) | Ethylene Feed rate (lb/hr) | 1-Hexene Feed rate (lb/hr) | Melt index (g/10 min) |
|---|---|---|---|---|---|---|
| 2A | 199.7 | 115.6 | 11.000 | 56500 | 1054.1 | 0.200 |
| 2B | 200.2 | 105.8 | 9.987 | 63000 | 1212.6 | 0.250 |
| 2C | 205.9 | 111.3 | 9.987 | 67000 | 1151.3 | 0.300 |
| 2D | 207.7 | 117.0 | 9.987 | 70000 | 872.2 | 0.350 |
| 2E | 210.2 | 112.4 | 10.000 | 69600 | 1020.2 | 0.400 |
| 2F | 206.4 | 141.6 | 13.998 | 78000 | 1108.7 | 0.440 |

Example 3

The table below sets out samples of polymerization data in the following table obtained under various conditions from the copolymerization of ethylene and 1-hexene to produce a polyethylene having a target density ($d_T$) in the range from 0.952 to 0.955.

TABLE 3

Copolymerization of ethylene and 1-hexene to produce a polyethylene having a target density ($d_T$) in the range from 0.952 to 0.955.

| Example | Polymerization temperature (° F.) | Ethylene partial pressure (psi) | Antistatic agent (ppm) | Ethylene Feed rate (lb/hr) | 1-Hexene Feed rate (lb/hr) | Melt index (g/10 min) |
|---|---|---|---|---|---|---|
| 3A | 200.6 | 163.4 | 11.000 | 46000 | 735.5 | 0.200 |
| 3B | 200.1 | 162.0 | 10.000 | 50000 | 725.9 | 0.250 |
| 3C | 208.8 | 100.7 | 10.000 | 68500 | 763.8 | 0.300 |
| 3D | 212.0 | 117.3 | 9.987 | 60000 | 393.1 | 0.350 |
| 3E | 211.7 | 106.5 | 10.000 | 65100 | 479.4 | 0.400 |
| 3F | 211.5 | 106.2 | 10.000 | 65100 | 478.7 | 0.440 |

Example 4

The table below sets out samples of polymerization data in the following table obtained under various conditions from the copolymerization of ethylene and 1-hexene to produce a polyethylene having a target density ($d_T$) in the range from 0.956 to 0.960.

TABLE 4

Copolymerization of ethylene and 1-hexene to produce a polyethylene having a target density ($d_T$) in the range from 0.956 to 0.960.

| Example | Polymerization temperature (° F.) | Ethylene partial pressure (psi) | Antistatic agent (ppm) | Ethylene Feed rate (lb/hr) | 1-Hexene Feed rate (lb/hr) | Melt index (g/10 min) |
|---|---|---|---|---|---|---|
| 4A | 212.4 | 110.1 | 13.500 | 59000 | 208.7 | 0.200 |
| 4B | 214.0 | 109.5 | 13.500 | 59000 | 175.8 | 0.250 |
| 4C | 212.2 | 117.6 | 9.987 | 66000 | 188.8 | 0.300 |
| 4D | 212.7 | 119.2 | 9.987 | 64000 | 316.3 | 0.350 |
| 4E | 211.5 | 114.8 | 13.500 | 64000 | 261.0 | 0.400 |
| 4F | 212.6 | 109.6 | 14.000 | 62500 | 260.7 | 0.450 |

To further illustrate the correlation between the melt index and amount of antistatic agent exemplary aspects are included below. Generally, these aspects are organized according the target melt indices. The particular aspects disclosed below are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed below may be altered, combined, or modified and all such variations are considered within the scope and spirit of the present disclosure.

ASPECTS OF THE PRESENT DISCLOSURE

The following exemplary aspects are set out according to the desired density of the polyethylene, which is termed target density.
Target Density ($d_T$) from 0.940 to 0.946
In a first aspect, this disclosure provides a process for polymerizing olefins is described, the process comprising:
 in a polymerization reactor, contacting (a) a polymerization catalyst, (b) ethylene, (c) an optional α-olefin comonomer, and (d) (x+y) ppm by weight of an antistatic agent on an ethylene basis under selected polymerization conditions to produce a polyethylene having a target density ($d_T$) in the range from 0.940 to 0.946, and a target melt index $MI^t$ (g/10 min);
 wherein x and y are greater than 0, and x is calculated according to the formula:

$$MI^t = MI^c + ax;$$

wherein $MI^c$ is a melt index (g/10 min) of a comparative polyethylene produced in the presence of y ppm antistatic agent under comparative polymerization conditions that are otherwise identical to the selected polymerization conditions, and wherein the coefficient a is selected from the following table according to the target melt index ($MI^t$):

| Target Melt Index ($MI^t$) | a |
|---|---|
| $0.25 \leq MI^t < 0.30$ | $2.9 \times 10^{-3}$ |
| $0.30 \leq MI^t \leq 0.40$ | $7.5 \times 10^{-4}$ |

In accordance with a second aspect of the present disclosure, the process according to the first aspect of the present disclosure is described, wherein the polymerization reactor is selected from a gas phase reactor, a fluidized bed reactor, a loop reactor, a stirred tank reactor, a loop-slurry reactor, or a slurry reactor.

In accordance with a third aspect of the present disclosure the process according to any one of the first and second aspects of the present disclosure is described, wherein the polymerization catalyst is selected from a chromium catalyst, a metallocene catalyst, a post-metallocene catalyst, or a Ziegler-Natta catalyst.

In accordance with a fourth aspect of the present disclosure, the process according to any one of the first to third aspects of the present disclosure is described, wherein the target melt index $MI^t$ is at least 20% greater than the melt index $MI^c$ of the comparative polyethylene.

In accordance with a fifth aspect of the present disclosure, the process according to any one of the first to third aspects of the present disclosure is described, wherein the target melt index $MI^t$ is at least 50% greater than the melt index $MI^c$ of the comparative polyethylene.

In accordance with a sixth aspect of the present disclosure, the process according to any one of the first to fifth aspects of the present disclosure is described, wherein the normalized catalyst activity in the production of the polyethylene decreases by less than 10% from the normalized catalyst activity in the production of the comparative polyethylene.

In accordance with a seventh aspect of the present disclosure, the process according to any one of the first to sixth aspects of the present disclosure is described, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

In accordance with an eighth aspect of the present disclosure, the process according to any one of the first to sixth aspects of the present disclosure is described, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

In accordance with a ninth aspect of the present disclosure, the process according to any one of the first to sixth aspects of the present disclosure is described, wherein the antistatic agent comprises an aryl sulfonic acid, a $C_8$-$C_{18}$ alkyl-substituted aryl sulfonic acid, salts thereof, or any combination thereof.

In accordance with a tenth aspect of the present disclosure, the process according to any one of the first to sixth aspects of the present disclosure is described, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

In accordance with an eleventh aspect of the present disclosure, the process according to any one of the first to sixth aspects of the present disclosure is described, wherein the antistatic agent comprises STADIS® 425 antistatic agent, STADIS® 450 antistatic agent, Dorf Ketal SR 1795® antistatic agent, TOLAD® 3512 antistatic agent, ARMOSTAT® 310 antistatic agent, ATMER® 163 antistatic agent, ATMER® AS-990 antistatic agent, KEROSTAT CE® 4009 antistatic agent, KEROSTAT CE® 5009 antistatic agent, POLYFLO® 130 antistatic agent, TOLAD® 511 antistatic agent, STATSAFE® 3000 antistatic agent, STATSAFE® 6000 antistatic agent, or EDENOL® D32 antistatic agent.

In accordance with a twelfth aspect of the present disclosure, the process according to any one of the first to sixth aspects of the present disclosure is described, wherein the antistatic agent is selected from STADIS® 425 antistatic agent, STADIS® 450 antistatic agent, or Dorf Ketal SR 1795® antistatic agent.

In accordance with a thirteenth aspect of the present disclosure, a process for maintaining the melt index of a polyethylene while lowering the polymerization temperature in a gas-phase reaction is described, the process comprising:

in a gas-phase polymerization reactor, contacting (a) a chromium polymerization catalyst, (b) ethylene, (c) an optional α-olefin comonomer, and (d) (x+y) ppm of an antistatic agent under selected polymerization conditions comprising a target temperature $T^t$ to produce a polyethylene having a target density ($d_T$) in the range from 0.940 to 0.946, and a target melt index $MI^t$ (g/10 min);

wherein x and y are greater than 0, and the target temperature $T^t$ is calculated according to the formula;

$$T^t(° F.) = T^c(° F.) - a(° F.)x;$$

wherein $T^c$ is a comparative temperature at which the polyethylene having the melt index MI is produced in the presence of y ppm antistatic agent under comparative polymerization conditions that are otherwise identical to the selected polymerization conditions, and wherein the coefficient a is selected from the following table according to the target melt index ($MI^t$):

| Target Melt Index ($MI^t$) | a |
|---|---|
| $0.25 \le MI^t < 0.30$ | $2.3 \times 10^0$ |
| $0.30 \le MI^t \le 0.40$ | $5.2 \times 10^{-1}$ |

In accordance with a fourteenth aspect of the present disclosure, the process according to the thirteenth aspect of the present disclosure is described, wherein $T^t$ is from 0.5° F. to 15° F. lower than $T^c$.

In accordance with a fifteenth aspect of the present disclosure, the process according to the thirteenth aspect of the present disclosure is described, wherein $T^t$ is from 1.0° F. to 10° F. lower than $T^c$.

In accordance with a sixteenth aspect of the present disclosure, a process for increasing the melt index of a polymer is described, the process comprising:

in a polymerization reactor, contacting (a) a polymerization catalyst, (b) ethylene ($C_2$), (c) 1-hexene ($C_6$), and (d) an antistatic agent under polymerization conditions of temperature (° F.), $C_2$ pressure (psi), antistatic agent concentration (ppm on $C_2$ basis), and $C_6$ concentration (weight ratio to $C_2$) to produce a polyethylene having a target density ($d_T$) in the range from 0.940 to 0.946, and a target melt index $MI^t$ (g/10 min);

wherein the antistatic agent is present at a concentration of greater than 10 ppm by weight on an ethylene basis, which is selected based on a polyethylene target melt index ($MI^t$, g/10 min) according to the formula:

$MI^t$(target melt index)=$b$(° F.)+$c$($C_2$ partial pressure, psi)+$d$(ppm antistatic agent on $C_2$ basis);

and wherein the coefficients b, c, and d are selected from the following table target melt index ($MI^t$):

| Target Melt Index ($MI^t$) | b | c | d |
| --- | --- | --- | --- |
| $0.25 \leq MI^t < 0.30$ | $1.3 \times 10^{-3}$ | $-1.3 \times 10^{-4}$ | $2.9 \times 10^{-3}$ |
| $0.30 \leq MI^t \leq 0.40$ | $1.4 \times 10^{-3}$ | $1.6 \times 10^{-4}$ | $7.5 \times 10^{-4}$ |

In accordance with a seventeenth aspect of the present disclosure, the process according to the sixteenth aspect of the present disclosure is described, wherein the polymerization reactor is selected from a gas phase reactor, a fluidized bed reactor, a loop reactor, a stirred tank reactor, a loop-slurry reactor, or a slurry-phase polymerization reactor.

In accordance with an eighteenth aspect of the present disclosure, the process according to any of the sixteenth and seventeenth aspects of the present disclosure is described, wherein the polymerization catalyst is selected from a chromium catalyst, a metallocene catalyst, a post-metallocene catalyst, or a Ziegler-Natta catalyst.

In accordance with a nineteenth aspect of the present disclosure, the process according to any one of the sixteenth to eighteenth aspects of the present disclosure is described, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

In accordance with a twentieth aspect of the present disclosure, the process according to any one of the sixteenth to eighteenth aspects of the present disclosure is described, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

In accordance with a twenty-first aspect of the present disclosure, the process according to any one of the sixteenth to eighteenth aspects of the present disclosure is described, wherein the antistatic agent comprises an aryl sulfonic acid, a $C_8$-$C_{18}$ alkyl-substituted aryl sulfonic acid, salts thereof, or any combination thereof.

In accordance with a twenty-second aspect of the present disclosure, the process according to any one of the sixteenth to eighteenth aspects of the present disclosure is described, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

In accordance with a twenty-third aspect of the present disclosure, the process according to any one of the sixteenth to eighteenth aspects of the present disclosure is described, wherein the antistatic agent comprises STADIS® 425 antistatic agent, STADIS® 450 antistatic agent, Dorf Ketal SR 1795® antistatic agent, TOLAD® 3512 antistatic agent, ARMOSTAT® 310 antistatic agent, ATMER® 163 antistatic agent, ATMER® AS-990 antistatic agent, KEROSTAT CE® 4009 antistatic agent, KEROSTAT CE® 5009 antistatic agent, POLYFLO® 130 antistatic agent, TOLAD® 511 antistatic agent, STATSAFE® 3000 antistatic agent, STATSAFE® 6000 antistatic agent, or EDENOL® D32 antistatic agent.

Target Density ($d_T$) from 0.947 to 0.951

In accordance with a twenty-fourth aspect of the present disclosure, a process for polymerizing olefins is described, the process comprising:

in a polymerization reactor, contacting (a) a polymerization catalyst, (b) ethylene, (c) an optional α-olefin comonomer, and (d) (x+y) ppm by weight of an antistatic agent on an ethylene basis under selected polymerization conditions to produce a polyethylene having a target density ($d_T$) in the range from 0.947 to 0.951, and a target melt index $MI^t$ (g/10 min);

wherein x and y are greater than 0, and x is calculated according to the formula:

$MI^t = MI^c + ax$;

wherein $MI^c$ is a melt index (g/10 min) of a comparative polyethylene produced in the presence of y ppm antistatic agent under comparative polymerization conditions that are otherwise identical to the selected polymerization conditions, and wherein the coefficient a is selected from the following table according to the target melt index ($MI^t$):

| Target Melt Index ($MI^t$) | a |
| --- | --- |
| $0.25 \leq MI^t < 0.30$ | $3.4 \times 10^{-3}$ |
| $0.30 \leq MI^t \leq 0.40$ | $2.6 \times 10^{-3}$ |
| $0.40 < MI^t \leq 0.44$ | $1.7 \times 10^{-4}$ |

In accordance with a twenty-fifth aspect of the present disclosure, the process according to the twenty-fourth aspect of the present disclosure is described, wherein the polymerization reactor is selected from a gas phase reactor, a fluidized bed reactor, a loop reactor, a stirred tank reactor, a loop-slurry reactor, or a slurry reactor.

In accordance with a twenty-sixth aspect of the present disclosure, the process according to any of the twenty-fourth or twenty-fifth aspects of the present disclosure is described, wherein the polymerization catalyst is selected from a chromium catalyst, a metallocene catalyst, a post-metallocene catalyst, or a Ziegler-Natta catalyst.

In accordance with a twenty-seventh aspect of the present disclosure, the process according to any one of the twenty-fourth to twenty-sixth aspects of the present disclosure is described, wherein the target melt index $MI^t$ is at least 20% greater than the melt index $MI^c$ of the comparative polyethylene.

In accordance with a twenty-eighth aspect of the present disclosure, the process according to any one of the twenty-fourth to twenty-sixth aspects of the present disclosure is described, wherein the target melt index $MI^t$ is at least 50% greater than the melt index $MI^c$ of the comparative polyethylene.

In accordance with a twenty-ninth aspect of the present disclosure, the process according to any one of the twenty-fourth to twenty-eighth aspects of the present disclosure is described, wherein the normalized catalyst activity in the production of the polyethylene decreases by less than 10% from the normalized catalyst activity in the production of the comparative polyethylene.

In accordance with a thirtieth aspect of the present disclosure, the process according to any one of the twenty-fourth to twenty-ninth aspects of the present disclosure is described, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

In accordance with a thirty-first aspect of the present disclosure, the process according to any one of the twenty-fourth to twenty-ninth aspects of the present disclosure is described, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

In accordance with a thirty-second aspect of the present disclosure, the process according to any one of the twenty-fourth to twenty-ninth aspects of the present disclosure is described, wherein the antistatic agent comprises an aryl sulfonic acid, a $C_8$-$C_{18}$ alkyl-substituted aryl sulfonic acid, salts thereof, or any combination thereof.

In accordance with a thirty-third aspect of the present disclosure, the process according to any one of the twenty-fourth to twenty-ninth aspects of the present disclosure is described, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

In accordance with a thirty-fourth aspect of the present disclosure, the process according to any one of the twenty-fourth to twenty-ninth aspects of the present disclosure is described, wherein the antistatic agent comprises STADIS® 425 antistatic agent, STADIS® 450 antistatic agent, Dorf Ketal SR 1795® antistatic agent, TOLAD® 3512 antistatic agent, ARMOSTAT® 310 antistatic agent, ATMER® 163 antistatic agent, ATMER® AS-990 antistatic agent, KEROSTAT CE® 4009 antistatic agent, KEROSTAT CE® 5009 antistatic agent, POLYFLO® 130 antistatic agent, TOLAD® 511 antistatic agent, STATSAFE® 3000 antistatic agent, STATSAFE® 6000 antistatic agent, or EDENOL® D32 antistatic agent.

In accordance with a thirty-fifth aspect of the present disclosure, the process according to any one of the twenty-fourth to twenty-ninth aspects of the present disclosure is described, wherein the antistatic agent is selected from STADIS® 425 antistatic agent, STADIS® 450 antistatic agent, or Dorf Ketal SR 1795® antistatic agent.

In accordance with a thirty-sixth aspect of the present disclosure, a process for maintaining the melt index of a polyethylene while lowering the polymerization temperature in a gas-phase reaction, is described, the process comprising:

in a gas-phase polymerization reactor, contacting (a) a chromium polymerization catalyst, (b) ethylene, (c) an optional α-olefin comonomer, and (d) (x+y) ppm of an antistatic agent under selected polymerization conditions comprising a target temperature $T^t$ to produce a polyethylene having a target density ($d_T$) in the range from 0.947 to 0.951, and a target melt index $MI^t$ (g/10 min);

wherein x and y are greater than 0, and the target temperature $T^t$ is calculated according to the formula;

$$T^t(° F.) = T^c(° F.) - a(° F.)x;$$

wherein $T^c$ is a comparative temperature at which the polyethylene having the melt index MI is produced in the presence of y ppm antistatic agent under comparative polymerization conditions that are otherwise identical to the selected polymerization conditions, and wherein the coefficient a is selected from the following table according to the target melt index ($MI^t$):

| Target Melt Index ($MI^t$) | a |
|---|---|
| $0.25 ≤ MI^t < 0.30$ | $2.6 \times 10^0$ |
| $0.30 ≤ MI^t ≤ 0.40$ | $2.0 \times 10^0$ |
| $0.40 < MI^t ≤ 0.44$ | $9.4 \times 10^{-2}$ |

In accordance with a thirty-seventh aspect of the present disclosure, the process according to the thirty-sixth aspect of the present disclosure is described, wherein $T^t$ is from 0.5° F. to 15° F. lower than $T^c$.

In accordance with a thirty-eighth aspect of the present disclosure, the process according to the thirty-sixth aspect of the present disclosure is described, wherein $T^t$ is from 1.0° F. to 10° F. lower than $T^c$.

In accordance with a thirty-ninth aspect of the present disclosure, a process for increasing the melt index of a polymer is described, the process comprising:

in a polymerization reactor, contacting (a) a polymerization catalyst, (b) ethylene ($C_2$), (c) 1-hexene ($C_6$), and (d) an antistatic agent under polymerization conditions of temperature (° F.), $C_2$ pressure (psi), antistatic agent concentration (ppm on $C_2$ basis), and $C_6$ concentration (weight ratio to $C_2$) to produce a polyethylene having a target density ($d_T$) in the range from 0.947 to 0.951, and a target melt index $MI^t$ (g/10 min);

wherein the antistatic agent is present at a concentration of greater than 10 ppm by weight on an ethylene basis, which is selected based on a polyethylene target melt index ($MI^t$, g/10 min) according to the formula:

$$MI^t(\text{target melt index}) = b(° F.) + c(C_2 \text{ partial pressure, psi}) + d(\text{ppm antistatic agent on } C_2 \text{ basis});$$

and wherein the coefficients b, c, and d are selected from the following table target melt index ($MI^t$):

| Target Melt Index ($MI^t$) | b | c | d |
|---|---|---|---|
| $0.25 ≤ MI^t < 0.30$ | $1.3 \times 10^{-3}$ | $-2.7 \times 10^{-4}$ | $3.4 \times 10^{-3}$ |
| $0.30 ≤ MI^t ≤ 0.40$ | $1.3 \times 10^{-3}$ | $2.0 \times 10^{-4}$ | $2.6 \times 10^{-3}$ |
| $0.40 < MI^t ≤ 0.44$ | $1.8 \times 10^{-3}$ | $3.9 \times 10^{-4}$ | $1.7 \times 10^{-4}$ |

In accordance with a fortieth aspect of the present disclosure, the process according to the thirty-ninth aspect of the present disclosure is described, wherein the polymerization reactor is selected from a gas phase reactor, a fluidized bed reactor, a loop reactor, a stirred tank reactor, a loop-slurry reactor, or a slurry-phase polymerization reactor.

In accordance with a forty-first aspect of the present disclosure, the process according to any one of the thirty-ninth and fortieth aspects of the present disclosure is described, wherein the polymerization catalyst is selected from a chromium catalyst, a metallocene catalyst, a post-metallocene catalyst, or a Ziegler-Natta catalyst.

In accordance with a forty-second aspect of the present disclosure, the process according to any one of the thirty-ninth to forty-first aspects of the present disclosure is described, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

In accordance with a forty-third aspect of the present disclosure, the process according to any one of the thirty-ninth to forty-first aspects of the present disclosure is described, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

In accordance with a forty-fourth aspect of the present disclosure, the process according to any one of the thirty-ninth to forty-first aspects of the present disclosure is described, wherein the antistatic agent comprises an aryl sulfonic acid, a $C_8$-$C_{18}$ alkyl-substituted aryl sulfonic acid, salts thereof, or any combination thereof.

In accordance with a forty-fifth aspect of the present disclosure, the process according to any one of the thirty-ninth to forty-first aspects of the present disclosure is described, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

In accordance with a forty-sixth aspect of the present disclosure, the process according to any one of the thirty-ninth to forty-first aspects of the present disclosure is described, wherein the antistatic agent comprises STADIS® 425 antistatic agent, STADIS® 450 antistatic agent, Dorf Ketal SR 1795® antistatic agent, TOLAD® 3512 antistatic agent, ARMOSTAT® 310 antistatic agent, ATMER® 163 antistatic agent, ATMER® AS-990 antistatic agent, KEROSTAT CE® 4009 antistatic agent, KEROSTAT CE® 5009 antistatic agent, POLYFLO® 130 antistatic agent, TOLAD® 511 antistatic agent, STATSAFE® 3000 antistatic agent, STATSAFE® 6000 antistatic agent, or EDENOL® D32 antistatic agent.

Target Density ($d_T$) from 0.952 to 0.955

In accordance with a forty-seventh aspect of the present disclosure, a process for polymerizing olefins is described, the process comprising:

in a polymerization reactor, contacting (a) a polymerization catalyst, (b) ethylene, (c) an optional α-olefin comonomer, and (d) (x+y) ppm by weight of an antistatic agent on an ethylene basis under selected polymerization conditions to produce a polyethylene having a target density ($d_T$) in the range from 0.952 to 0.955, and a target melt index $MI^t$ (g/10 min);

wherein x and y are greater than 0, and x is calculated according to the formula:

$MI^t = MI^c + ax;$ wherein $MI^c$ is a melt index (g/10 min) of a comparative polyethylene produced in the presence of y ppm antistatic agent under comparative polymerization conditions that are otherwise identical to the selected polymerization conditions, and wherein the coefficient a is selected from the following table according to the target melt index ($MI^t$):

| Target Melt Index ($MI^t$) | a |
|---|---|
| $0.25 \le MI^t < 0.30$ | $1.6 \times 10^{-3}$ |
| $0.30 \le MI^t \le 0.40$ | $3.2 \times 10^{-4}$ |
| $0.40 < MI^t \le 0.44$ | $2.9 \times 10^{-3}$ |

In accordance with a forty-eighth aspect of the present disclosure, the process according to the forty-seventh aspect of the present disclosure is described, wherein the polymerization reactor is selected from a gas phase reactor, a fluidized bed reactor, a loop reactor, a stirred tank reactor, a loop-slurry reactor, or a slurry reactor.

In accordance with a forty-ninth aspect of the present disclosure, the process according to any one of the forty-seventh and forty-eighth aspects of the present disclosure is described, wherein the polymerization catalyst is selected from a chromium catalyst, a metallocene catalyst, a post-metallocene catalyst, or a Ziegler-Natta catalyst.

In accordance with a fiftieth aspect of the present disclosure, the process according to any one of the forty-seventh to forty-ninth aspects of the present disclosure is described, wherein the target melt index $MI^t$ is at least 20% greater than the melt index $MI^c$ of the comparative polyethylene.

In accordance with a fifty-first aspect of the present disclosure, the process according to any one of the forty-seventh and forty-ninth aspects of the present disclosure is described, wherein the target melt index $MI^t$ is at least 50% greater than the melt index $MI^c$ of the comparative polyethylene.

In accordance with a fifty-second aspect of the present disclosure, the process according to any one of the forty-seventh to fifty-first aspects of the present disclosure is described, wherein the normalized catalyst activity in the production of the polyethylene decreases by less than 10% from the normalized catalyst activity in the production of the comparative polyethylene.

In accordance with a fifty-third aspect of the present disclosure, the process according to any one of the forty-seventh to fifty-second aspects of the present disclosure is described, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

In accordance with a fifty-fourth aspect of the present disclosure, the process according to any one of the forty-seventh to fifty-second aspects of the present disclosure is described, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

In accordance with a fifty-fifth aspect of the present disclosure, the process according to any one of the forty-seventh to fifty-second aspects of the present disclosure is described, wherein the antistatic agent comprises an aryl sulfonic acid, a $C_8$-$C_{18}$ alkyl-substituted aryl sulfonic acid, salts thereof, or any combination thereof.

In accordance with a fifty-sixth aspect of the present disclosure, the process according to any one of the forty-seventh to fifty-second aspects of the present disclosure is described, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

In accordance with a fifty-seventh aspect of the present disclosure, the process according to any one of the forty-seventh to fifty-second aspects of the present disclosure is described, wherein the antistatic agent comprises STADIS® 425 antistatic agent, STADIS® 450 antistatic agent, Dorf Ketal SR 1795® antistatic agent, TOLAD® 3512 antistatic agent, ARMOSTAT® 310 antistatic agent, ATMER® 163 antistatic agent, ATMER® AS-990 antistatic agent, KEROSTAT CE® 4009 antistatic agent, KEROSTAT CE® 5009 antistatic agent, POLYFLO® 130 antistatic agent, TOLAD® 511 antistatic agent, STATSAFE® 3000 antistatic agent, STATSAFE® 6000 antistatic agent, or EDENOL® D32 antistatic agent.

In accordance with a fifty-eighth aspect of the present disclosure, the process according to any one of the forty-seventh to fifty-second aspects of the present disclosure is described, wherein the antistatic agent is selected from STADIS® 425 antistatic agent, STADIS® 450 antistatic agent, or Dorf Ketal SR 1795® antistatic agent.

In accordance with a fifty-ninth aspect of the present disclosure, a process for maintaining the melt index of a polyethylene while lowering the polymerization temperature in a gas-phase reaction is described, the process comprising:

in a gas-phase polymerization reactor, contacting (a) a chromium polymerization catalyst, (b) ethylene, (c) an optional α-olefin comonomer, and (d) (x+y) ppm of an antistatic agent under selected polymerization conditions comprising a target temperature $T^t$ to produce a polyethylene having a target density ($d_T$) in the range from 0.952 to 0.955, and a target melt index $MI^t$ (g/10 min);

wherein x and y are greater than 0, and the target temperature $T^t$ is calculated according to the formula:

$$T^t(°\text{ F.}) = T^c(°\text{ F.}) - a(°\text{ F.})x;$$

wherein $T^c$ is a comparative temperature at which the polyethylene having the melt index MI is produced in the presence of y ppm antistatic agent under comparative polymerization conditions that are otherwise identical to the selected polymerization conditions, and wherein the coefficient a is selected from the following table according to the target melt index ($MI^t$):

| Target Melt Index ($MI^t$) | a |
|---|---|
| 0.25 ≤ $MI^t$ < 0.30 | 1.2 × 10⁰ |
| 0.30 ≤ $MI^t$ ≤ 0.40 | 2.3 × 10⁻¹ |
| 0.40 < $MI^t$ ≤ 0.44 | 1.5 × 10⁰ |

In accordance with a sixtieth aspect of the present disclosure, the process according to the fifty-ninth aspect of the present disclosure is described, wherein $T^t$ is from 0.5° F. to 15° F. lower than $T^c$.

In accordance with a sixty-first aspect of the present disclosure, the process according to the fifty-ninth aspect of the present disclosure is described, wherein $T^t$ is from 1.0° F. to 10° F. lower than $T^c$.

In accordance with a sixty-second aspect of the present disclosure, a process for increasing the melt index of a polymer is described, the process comprising:

in a polymerization reactor, contacting (a) a polymerization catalyst, (b) ethylene ($C_2$), (c) 1-hexene ($C_6$), and (d) an antistatic agent under polymerization conditions of temperature (° F.), $C_2$ pressure (psi), antistatic agent concentration (ppm on $C_2$ basis), and $C_6$ concentration (weight ratio to $C_2$) to produce a polyethylene having a target density ($d_T$) in the range from 0.952 to 0.955, and a target melt index $MI^t$ (g/10 min);

wherein the antistatic agent is present at a concentration of greater than 10 ppm by weight on an ethylene basis, which is selected based on a polyethylene target melt index ($MI^t$, g/10 min) according to the formula:

$$MI^t(\text{target melt index}) = b(°\text{ F.}) + c(C_2\text{ partial pressure, psi}) + d(\text{ppm antistatic agent on } C_2\text{ basis});$$

and wherein the coefficients b, c, and d are selected from the following table target melt index ($MI^t$):

| Target Melt Index ($MI^t$) | b | c | d |
|---|---|---|---|
| 0.25 ≤ $MI^t$ < 0.30 | 1.4 × 10⁻³ | −3.2 × 10⁻⁴ | 1.6 × 10⁻³ |
| 0.30 ≤ $MI^t$ ≤ 0.40 | 1.4 × 10⁻³ | 3.4 × 10⁻⁴ | 3.2 × 10⁻⁴ |
| 0.40 < $MI^t$ ≤ 0.44 | 2.0 × 10⁻³ | −2.4 × 10⁻⁴ | 2.9 × 10⁻³ |

In accordance with a sixty-third aspect of the present disclosure, the process according to the sixty-second aspect of the present disclosure is described, wherein the polymerization reactor is selected from a gas phase reactor, a fluidized bed reactor, a loop reactor, a stirred tank reactor, a loop-slurry reactor, or a slurry-phase polymerization reactor.

In accordance with a sixty-fourth aspect of the present disclosure, the process according to any one of the sixty-second and sixty-third aspects of the present disclosure is described, wherein the polymerization catalyst is selected from a chromium catalyst, a metallocene catalyst, a post-metallocene catalyst, or a Ziegler-Natta catalyst.

In accordance with a sixty-fifth aspect of the present disclosure, the process according to any one of the sixty-second to sixty-fourth aspects of the present disclosure is described, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

In accordance with a sixty-sixth aspect of the present disclosure, the process according to any one of the sixty-second to sixty-fourth aspects of the present disclosure is described, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

In accordance with a sixty-seventh aspect of the present disclosure, the process according to any one of the sixty-second to sixty-fourth aspects of the present disclosure is described, wherein the antistatic agent comprises an aryl sulfonic acid, a $C_8$-$C_{18}$ alkyl-substituted aryl sulfonic acid, salts thereof, or any combination thereof.

In accordance with a sixty-eighth aspect of the present disclosure, the process according to any one of the sixty-second to sixty-fourth aspects of the present disclosure is described, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

In accordance with a sixty-ninth aspect of the present disclosure, the process according to any one of the sixty-second to sixty-fourth aspects of the present disclosure is described, wherein the antistatic agent comprises STADIS® 425 antistatic agent, STADIS® 450 antistatic agent, Dorf Ketal SR 1795® antistatic agent, TOLAD® 3512 antistatic agent, ARMOSTAT® 310 antistatic agent, ATMER® 163 antistatic agent, ATMER® AS-990 antistatic agent, KEROSTAT CE® 4009 antistatic agent, KEROSTAT CE® 5009 antistatic agent, POLYFLO® 130 antistatic agent, TOLAD® 511 antistatic agent, STATSAFE® 3000 antistatic agent, STATSAFE® 6000 antistatic agent, or EDENOL® D32 antistatic agent.

Target Density ($d_T$) from 0.956 to 0.960

In accordance with a seventieth aspect of the present disclosure, a process for polymerizing olefins is described, the process comprising:

in a polymerization reactor, contacting (a) a polymerization catalyst, (b) ethylene, (c) an optional α-olefin comonomer, and (d) (x+y) ppm by weight of an antistatic agent on an ethylene basis under selected polymerization conditions to produce a polyethylene having a target density ($d_T$) in the range from 0.956 to 0.960, and a target melt index $MI^t$ (g/10 min);

wherein x and y are greater than 0, and x is calculated according to the formula:

$MI^t = MI^c + ax;$ wherein $MI^c$ is a melt index (g/10 min) of a comparative polyethylene produced in the presence of y ppm antistatic agent under comparative polymerization conditions that are otherwise identical to the selected polymerization conditions, and wherein the coefficient a is selected from the following table according to the target melt index ($MI^t$):

| Target Melt Index ($MI^t$) | a |
|---|---|
| 0.25 ≤ $MI^t$ < 0.30 | 4.6 × 10$^{-5}$ |
| 0.30 ≤ $MI^t$ ≤ 0.40 | 2.2 × 10$^{-3}$ |
| 0.40 < $MI^t$ ≤ 0.45 | 1.9 × 10$^{-2}$ |

In accordance with a seventy-first aspect of the present disclosure, the process according to the seventieth aspect of the present disclosure is described, wherein the polymerization reactor is selected from a gas phase reactor, a fluidized bed reactor, a loop reactor, a stirred tank reactor, a loop-slurry reactor, or a slurry reactor.

In accordance with a seventy-second aspect of the present disclosure, the process according to any one of the seventieth and seventy-first aspects of the present disclosure is described, wherein the polymerization catalyst is selected from a chromium catalyst, a metallocene catalyst, a post-metallocene catalyst, or a Ziegler-Natta catalyst.

In accordance with a seventy-third aspect of the present disclosure, the process according to any one of the seventieth to seventy-second aspects of the present disclosure is described, wherein the target melt index $MI^t$ is at least 20% greater than the melt index $MI^c$ of the comparative polyethylene.

In accordance with a seventy-fourth aspect of the present disclosure, the process according to any one of the seventieth to seventy-second aspects of the present disclosure is described, wherein the target melt index $MI^t$ is at least 50% greater than the melt index $MI^c$ of the comparative polyethylene.

In accordance with a seventy-fifth aspect of the present disclosure, the process according to any one of the seventieth to seventy-fourth aspects of the present disclosure is described, wherein the normalized catalyst activity in the production of the polyethylene decreases by less than 10% from the normalized catalyst activity in the production of the comparative polyethylene.

In accordance with a seventy-sixth aspect of the present disclosure, the process according to any one of the seventieth to seventy-fifth aspects of the present disclosure is described, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

In accordance with a seventy-seventh aspect of the present disclosure, the process according to any one of the seventieth to seventy-fifth aspects of the present disclosure is described, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

In accordance with a seventy-eighth aspect of the present disclosure, the process according to any one of the seventieth to seventy-fifth aspects of the present disclosure is described, wherein the antistatic agent comprises an aryl sulfonic acid, a $C_8$-$C_{18}$ alkyl-substituted aryl sulfonic acid, salts thereof, or any combination thereof.

In accordance with a seventy-ninth aspect of the present disclosure, the process according to any one of the seventieth to seventy-fifth aspects of the present disclosure is described, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

In accordance with an eightieth aspect of the present disclosure, the process according to any one of the seventieth to seventy-fifth aspects of the present disclosure is described, wherein the antistatic agent comprises STADIS® 425 antistatic agent, STADIS® 450 antistatic agent, Dorf Ketal SR 1795® antistatic agent, TOLAD® 3512 antistatic agent, ARMOSTAT® 310 antistatic agent, ATMER® 163 antistatic agent, ATMER® AS-990 antistatic agent, KERO- STAT CE® 4009 antistatic agent, KEROSTAT CE® 5009 antistatic agent, POLYFLO® 130 antistatic agent, TOLAD® 511 antistatic agent, STATSAFE® 3000 antistatic agent, STATSAFE® 6000 antistatic agent, or EDENOL® D32 antistatic agent.

In accordance with an eighty-first aspect of the present disclosure, the process according to any one of the seventieth to seventy-fifth aspects of the present disclosure is described, wherein the antistatic agent is selected from STADIS® 425 antistatic agent, STADIS® 450 antistatic agent, or Dorf Ketal SR 1795® antistatic agent.

In accordance with an eighty-second aspect of the present disclosure, a process for maintaining the melt index of a polyethylene while lowering the polymerization temperature in a gas-phase reaction is described, the process comprising:

in a gas-phase polymerization reactor, contacting (a) a chromium polymerization catalyst, (b) ethylene, (c) an optional α-olefin comonomer, and (d) (x+y) ppm of an antistatic agent under selected polymerization conditions comprising a target temperature $T^t$ to produce a polyethylene having a target density ($d_T$) in the range from 0.956 to 0.960, and a target melt index $MI^t$ (g/10 min);

wherein x and y are greater than 0, and the target temperature $T^t$ is calculated according to the formula;

$$T^t(° F.)=T^c(° F.)-a(° F.)x;$$

wherein $T^c$ is a comparative temperature at which the polyethylene having the melt index MI is produced in the presence of y ppm antistatic agent under comparative polymerization conditions that are otherwise identical to the selected polymerization conditions, and wherein the coefficient a is selected from the following table according to the target melt index ($MI^t$):

| Target Melt Index ($MI^t$) | a |
|---|---|
| 0.25 ≤ $MI^t$ < 0.30 | 3.2 × 10⁻² |
| 0.30 ≤ $MI^t$ ≤ 0.40 | 1.5 × 10⁰ |
| 0.40 < $MI^t$ ≤ 0.45 | 1.5 × 10¹ |

In accordance with an eighty-third aspect of the present disclosure, the process according to the eighty-second aspect of the present disclosure is described, wherein $T^t$ is from 0.5° F. to 15° F. lower than $T^c$.

In accordance with an eighty-fourth aspect of the present disclosure, the process according to the eighty-second aspect of the present disclosure is described, wherein $T^t$ is from 1.0° F. to 10° F. lower than $T^c$.

In accordance with an eighty-fifth aspect of the present disclosure, a process for increasing the melt index of a polymer is described, the process comprising:

in a polymerization reactor, contacting (a) a polymerization catalyst, (b) ethylene ($C_2$), (c) 1-hexene ($C_6$), and (d) an antistatic agent under polymerization conditions of temperature (° F.), $C_2$ pressure (psi), antistatic agent concentration (ppm on $C_2$ basis), and $C_6$ concentration (weight ratio to $C_2$) to produce a polyethylene having a target density ($d_T$) in the range from 0.956 to 0.960, and a target melt index $MI^t$ (g/10 min);

wherein the antistatic agent is present at a concentration of greater than 10 ppm by weight on an ethylene basis, which is selected based on a polyethylene target melt index ($MI^t$, g/10 min) according to the formula:

$$MI^t(\text{target melt index})=b(° F.)+c(C_2 \text{ partial pressure, psi})+d(\text{ppm antistatic agent on } C_2 \text{ basis});$$

and wherein the coefficients b, c, and d are selected from the following table target melt index ($MI^t$):

| Target Melt Index ($MI^t$) | b | c | d |
|---|---|---|---|
| 0.25 ≤ $MI^t$ < 0.30 | 1.4 × 10⁻³ | −1.5 × 10⁻⁴ | 4.6 × 10⁻⁵ |
| 0.30 ≤ $MI^t$ ≤ 0.40 | 1.5 × 10⁻³ | −5.4 × 10⁻⁵ | 2.2 × 10⁻³ |
| 0.40 < $MI^t$ ≤ 0.45 | 1.2 × 10⁻³ | −8.0 × 10⁻⁴ | 1.9 × 10⁻² |

In accordance with an eighty-sixth aspect of the present disclosure, the process according to the eighty-fifth aspect of the present disclosure is described, wherein the polymerization reactor is selected from a gas phase reactor, a fluidized bed reactor, a loop reactor, a stirred tank reactor, a loop-slurry reactor, or a slurry-phase polymerization reactor.

In accordance with an eighty-seventh aspect of the present disclosure, the process according to any one of the eighty-fifth and eighty-sixth aspects of the present disclosure is described, wherein the polymerization catalyst is selected from a chromium catalyst, a metallocene catalyst, a post-metallocene catalyst, or a Ziegler-Natta catalyst.

In accordance with an eighty-eighth aspect of the present disclosure, the process according to any one of the eighty-fifth to eighty-seventh aspects of the present disclosure is described, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

In accordance with an eighty-ninth aspect of the present disclosure, the process according to any one of the eighty-fifth to eighty-seventh aspects of the present disclosure is described, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

In accordance with a ninetieth aspect of the present disclosure, the process according to any one of the eighty-fifth to eighty-seventh aspects of the present disclosure is described, wherein the antistatic agent comprises an aryl sulfonic acid, a $C_8$-$C_{18}$ alkyl-substituted aryl sulfonic acid, salts thereof, or any combination thereof.

In accordance with a ninety-first aspect of the present disclosure, the process according to any one of the eighty-fifth to eighty-seventh aspects of the present disclosure is described, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

In accordance with a ninety-second aspect of the present disclosure, the process according to any one of the eighty-fifth to eighty-seventh aspects of the present disclosure is described, wherein the antistatic agent comprises STADIS® 425 antistatic agent, STADIS® 450 antistatic agent, Dorf Ketal SR 1795® antistatic agent, TOLAD® 3512 antistatic agent, ARMOSTAT® 310 antistatic agent, ATMER® 163 antistatic agent, ATMER® AS-990 antistatic agent, KEROSTAT CE® 4009 antistatic agent, KEROSTAT CE® 5009 antistatic agent, POLYFLO® 130 antistatic agent, TOLAD® 511 antistatic agent, STATSAFE® 3000 antistatic agent, STATSAFE® 6000 antistatic agent, or EDENOL® D32 antistatic agent.

Many variations will suggest themselves to those skilled in the art in light of the above detailed description. All such obvious variations are within the full intended scope of the appended claims and illustrative aspects. Other aspects of the present disclosure can include, but are not limited to, the following aspects. Many aspects are described as "comprising" certain components or steps, but alternatively, can "consist essentially of" or "consist of" those components or steps unless specifically stated otherwise.

We claim:

1. A process for polymerizing olefins, the process comprising:
in a polymerization reactor, contacting (a) a polymerization catalyst, (b) ethylene, (c) an optional α-olefin comonomer, and (d) (x+y) ppm by weight of an antistatic agent on an ethylene basis under selected polymerization conditions to produce a polyethylene having a target density ($d_T$) in the range from 0.940 to 0.960, and a target melt index $MI^t$ (g/10 min);
wherein x and y are greater than 0, and x is calculated according to the formula:

$$MI^t = MI^c + ax;$$

wherein $MI^c$ is a melt index (g/10 min) of a comparative polyethylene produced in the presence of y ppm antistatic agent under comparative polymerization conditions that are otherwise identical to the selected polymerization conditions, and wherein the coefficient a is selected from the following table according to the target melt index ($MI^t$):

| | a (For various target densities ($d_T$)) | | | |
|---|---|---|---|---|
| Target Melt Index ($MI^t$) | $d_T$ 0.940-0.946 | $d_T$ 0.947-0.951 | $d_T$ 0.952-0.955 | $d_T$ 0.956-0.960 |
| $0.25 \leq MI^t < 0.30$ | $2.9 \times 10^{-3}$ | $3.4 \times 10^{-3}$ | $1.6 \times 10^{-3}$ | $4.6 \times 10^{-5}$ |
| $0.30 \leq MI^t \leq 0.40$ | $7.5 \times 10^{-4}$ | $2.6 \times 10^{-3}$ | $3.2 \times 10^{-4}$ | $2.2 \times 10^{-3}$ |
| $0.40 < MI^t \leq 0.44$ | N/A | $1.7 \times 10^{-4}$ | $2.9 \times 10^{-3}$ | $1.9 \times 10^{-2}$ |

2. A process according to claim 1, wherein the polymerization reactor is selected from the group consisting of a gas phase reactor, a fluidized bed reactor, a loop reactor, a stirred tank reactor, a loop-slurry reactor, and a slurry reactor.

3. A process according to claim 1, wherein the polymerization catalyst is selected from the group consisting of a chromium catalyst, a metallocene catalyst, a post-metallocene catalyst, and a Ziegler-Natta catalyst.

4. A process according to claim 1, wherein the target melt index Mr is at least 20% greater than the melt index MI' of the comparative polyethylene.

5. A process according to claim 1, wherein the target melt index Mr is at least 50% greater than the melt index MI' of the comparative polyethylene.

6. A process according to claim 1, wherein the normalized catalyst activity in the production of the polyethylene decreases by less than 10% from the normalized catalyst activity in the production of the comparative polyethylene.

7. A process according to claim 1, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

8. A process according to claim 1, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

9. A process according to claim 1, wherein the antistatic agent comprises an aryl sulfonic acid, a $C_8$-$C_{18}$ alkyl-substituted aryl sulfonic acid, salts thereof, or any combination thereof.

10. A process according to claim 1, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

11. A process for maintaining the melt index of a polyethylene while lowering the polymerization temperature in a gas-phase reaction, the process comprising:
in a gas-phase polymerization reactor, contacting (a) a chromium polymerization catalyst, (b) ethylene, (c) an optional α-olefin comonomer, and (d) (x+y) ppm of an antistatic agent under selected polymerization conditions comprising a target temperature $T^t$ to produce a polyethylene having a target density ($d_T$) in the range from 0.940 to 0.960, and a target melt index $MI^t$ (g/10 min);
wherein x and y are greater than 0, and the target temperature $T^t$ is calculated according to the formula;

$$T^t(° F.) = T^c(° F.) - a(° F.)x;$$

wherein $T^c$ is a comparative temperature at which the polyethylene having the melt index MI is produced in the presence of y ppm antistatic agent under comparative polymerization conditions that are otherwise identical to the selected polymerization conditions, and wherein the coefficient a is selected from the following table according to the target melt index ($MI^t$):

| | a (For various target densities ($d_T$)) | | | |
|---|---|---|---|---|
| Target Melt Index ($MI^t$) | $d_T$ 0.940-0.946 | $d_T$ 0.947-0.951 | $d_T$ 0.952-0.955 | $d_T$ 0.956-0.960 |
| $0.25 \leq MI^t < 0.30$ | $2.3 \times 10^0$ | $2.6 \times 10^{-0}$ | $1.2 \times 10^{-0}$ | $3.2 \times 10^{-2}$ |
| $0.30 \leq MI^t \leq 0.40$ | $5.2 \times 10^{-1}$ | $2.0 \times 10^{-0}$ | $2.3 \times 10^{-1}$ | $1.5 \times 10^{-0}$ |
| $0.40 < MI^t \leq 0.44$ | N/A | $9.4 \times 10^{-2}$ | $1.5 \times 10^{-0}$ | $1.5 \times 10^1$ |

12. A process according to claim 11, wherein $T^t$ is from 0.5° F. to 15° F. lower than $T^c$.

13. A process according to claim 11, wherein $T^t$ is from 1.0° F. to 10° F. lower than $T^c$.

14. A process for increasing the melt index of a polymer, the process comprising:
in a polymerization reactor, contacting (a) a polymerization catalyst, (b) ethylene ($C_2$), (c) 1-hexene ($C_6$), and (d) an antistatic agent under polymerization conditions of temperature (° F.), $C_2$ partial pressure (psi), antistatic agent concentration (ppm on $C_2$ basis), and $C_6$ concentration (weight ratio to $C_2$) to produce a polyethylene having a target density ($d_T$) in the range from 0.940 to 0.960, and a target melt index Mr (g/10 min);

wherein the antistatic agent is present at a concentration of greater than 10 ppm by weight on an ethylene basis, which is selected based on a polyethylene target melt index (Mr, g/10 min) according to the formula:

$MI^t$(target melt index)=$b$(° F.)+$c$($C_2$ partial pressure, psi)+$d$(ppm antistatic agent on $C_2$ basis);

and wherein the coefficients b, c, and d are selected from the following table target melt index ($MI^t$):

| Target Melt Index ($MI^t$) | b | c | d |
|---|---|---|---|
| $d_T$ = 0.940-0.946 | | | |
| 0.25 ≤ $MI^t$ < 0.30 | 1.3 × 10$^{-3}$ | −1.3 × 10$^{-4}$ | 2.9 × 10$^{-3}$ |
| 0.30 ≤ $MI^t$ ≤ 0.40 | 1.4 × 10$^{-3}$ | 1.6 × 10$^{-4}$ | 7.5 × 10$^{-4}$ |
| $d_T$ = 0.947-0.951 | | | |
| 0.25 ≤ $MI^t$ < 0.30 | 1.3 × 10$^{-3}$ | −2.7 × 10$^{-4}$ | 3.4 × 10$^{-3}$ |
| 0.30 ≤ $MI^t$ ≤ 0.40 | 1.3 × 10$^{-3}$ | 2.0 × 10$^{-4}$ | 2.6 × 10$^{-3}$ |
| 0.40 < $MI^t$ ≤ 0.44 | 1.8 × 10$^{-3}$ | 3.9 × 10$^{-4}$ | 1.7 × 10$^{-4}$ |
| $d_T$ = 0.952-0.955 | | | |
| 0.25 ≤ $MI^t$ < 0.30 | 1.4 × 10$^{-3}$ | −3.2 × 10$^{-4}$ | 1.6 × 10$^{-3}$ |
| 0.30 ≤ $MI^t$ ≤ 0.40 | 1.4 × 10$^{-3}$ | 3.4 × 10$^{-4}$ | 3.2 × 10$^{-4}$ |
| 0.40 < $MI^t$ ≤ 0.44 | 2.0 × 10$^{-3}$ | −2.4 × 10$^{-4}$ | 2.9 × 10$^{-3}$ |
| $d_T$ = 0.956-0.960 | | | |
| 0.25 ≤ $MI^t$ < 0.30 | 1.4 × 10$^{-3}$ | −1.5 × 10$^{-4}$ | 4.6 × 10$^{-5}$ |
| 0.30 ≤ $MI^t$ ≤ 0.40 | 1.5 × 10$^{-3}$ | −5.4 × 10$^{-5}$ | 2.2 × 10$^{-3}$ |
| 0.40 < $MI^t$ ≤ 0.44 | 1.2 × 10$^{-3}$ | −8.0 × 10$^{-4}$ | 1.9 × 10$^{-2}$ |

15. A process according to claim 14, wherein the polymerization reactor is selected from the group consisting of a gas phase reactor, a fluidized bed reactor, a loop reactor, a stirred tank reactor, a loop-slurry reactor, and a slurry-phase polymerization reactor.

16. A process according to claim 14, wherein the polymerization catalyst is selected from the group consisting of a chromium catalyst, a metallocene catalyst, a post-metallocene catalyst, and a Ziegler-Natta catalyst.

17. A process according to claim 14, wherein the antistatic agent comprises an aryl sulfonic acid, an alkyl-substituted aryl sulfonic acid, a polyacrylate, a fatty acid, an aryl carboxylate, a fatty amine, an ethoxylated-amine, ethoxylated fatty amine, an ethoxylated-amide, an ethoxylated-ester, a glycerol ester, a glycerol diester, a glycerol triester, a fatty acid ester, an alkoxylated fatty acid ester, a fatty acid amide, an ethoxylated-amide, a fatty acid-metal complex, a fatty alcohol, a fatty ether, a dihydrocarbyl sulfate, a dihydrocarbyl sulfone, a hydrocarbyl sulfonic acid, a hydrocarbyl sulfonate, an α-olefin-acrylonitrile copolymer, a polymeric polyamine, a hydrocarbyl anthranilate, an anthranilic acid salt, a quaternary ammonium compound, metal oxides, metal salts thereof, or combinations thereof.

18. A process according to claim 14, wherein the antistatic agent comprises di-t-butylphenol, aluminum stearate, sorbitan monooleate, glycerol monostearate, methyl toluate, dimethyl maleate, dimethyl fumarate, triethylamine, or 3,3-diphenyl-3-(imidazol-1-yl)-propane.

19. A process according to claim 14, wherein the antistatic agent comprises an aryl sulfonic acid, a $C_8$-$C_{18}$ alkyl-substituted aryl sulfonic acid, salts thereof, or any combination thereof.

20. A process according to claim 14, wherein the antistatic agent comprises a $C_{10}$-$C_{16}$ alkyl-substituted benzenesulfonic acid, a $C_{10}$-$C_{16}$ alkyl-substituted naphthalenesulfonic acid, salts thereof, or any combination thereof.

* * * * *